United States Patent [19]
Hassler et al.

[11] Patent Number: 5,323,231
[45] Date of Patent: Jun. 21, 1994

[54] DEVICE AND PROCESS FOR MEASURING AN ELECTRON DENSITY DISTRIBUTION IN A CATHODE RAY TUBE WITH AN IMAGE CONVERTER CAMERA AND A SEQUENCE CONTROLLER

[75] Inventors: Joachim Hassler, Esslingen; Herbert Kilgus, Denkendorf; Jürgen Reinknecht, Hambergen, all of Fed. Rep. of Germany

[73] Assignee: Nokia Technology GmbH, Pforzheim, Fed. Rep. of Germany

[21] Appl. No.: 78,014

[22] Filed: Jun. 16, 1993

[30] Foreign Application Priority Data

Jun. 16, 1992 [DE] Fed. Rep. of Germany ....... 4219627

[51] Int. Cl.$^5$ .......................................... H04N 17/02
[52] U.S. Cl. .................................. 348/185; 348/811
[58] Field of Search ............................ 358/139, 10, 67; 315/368.11; H04N 17/02

[56] References Cited

U.S. PATENT DOCUMENTS 4,602,272  7/1986  Duschl .................................. 358/10

FOREIGN PATENT DOCUMENTS 0030259  6/1981  European Pat. Off. ........ H04N 9/62

OTHER PUBLICATIONS

Displays, Bd. 7, Nr. 1, Jan. 1986, Guildford GB Seiten 17-29 P. Keller 'Resolution measurement techniques for data display cathode ray tubes'.

SID International Symposium: Digest of Technical Papers, Mai 1987, New Orleans, US Seiten 225-227. D Bortfeld et al 'Semi-automatic measurement of the two-dimensional intensity distribution of a color CRT electron-beam spot' Seite 225, Measurement Techniques.

*Primary Examiner*—James J. Groody
*Assistant Examiner*—Cheryl Cohen

[57] ABSTRACT

The invention concerns the measurement of the radiant density of electron beams from shadow mask tubes. According to a known process, the beam is displaced on the screen and pictures are taken of the light spot areas, as they are detected by the effect of apertures when the beam has been displaced. The pictures are then evaluated with respect to their luminance distribution. This process requires an extraordinary number of adjustments. For that reason the invention states that the pictures are taken by an image converter camera, that light spots are produced over the entire field of view of the image converter, which serve as simulated apertures for the detection of light spot sections and that, to determine the luminous density distribution, the displacement width is selected so that the light spot sections that were detectable before a displacement step can no longer be detected after the displacement step, that the camera takes a picture before the first and after each displacement step, and that all the pictures are stored and composed into a total picture of the light spot distribution.

4 Claims, 6 Drawing Sheets

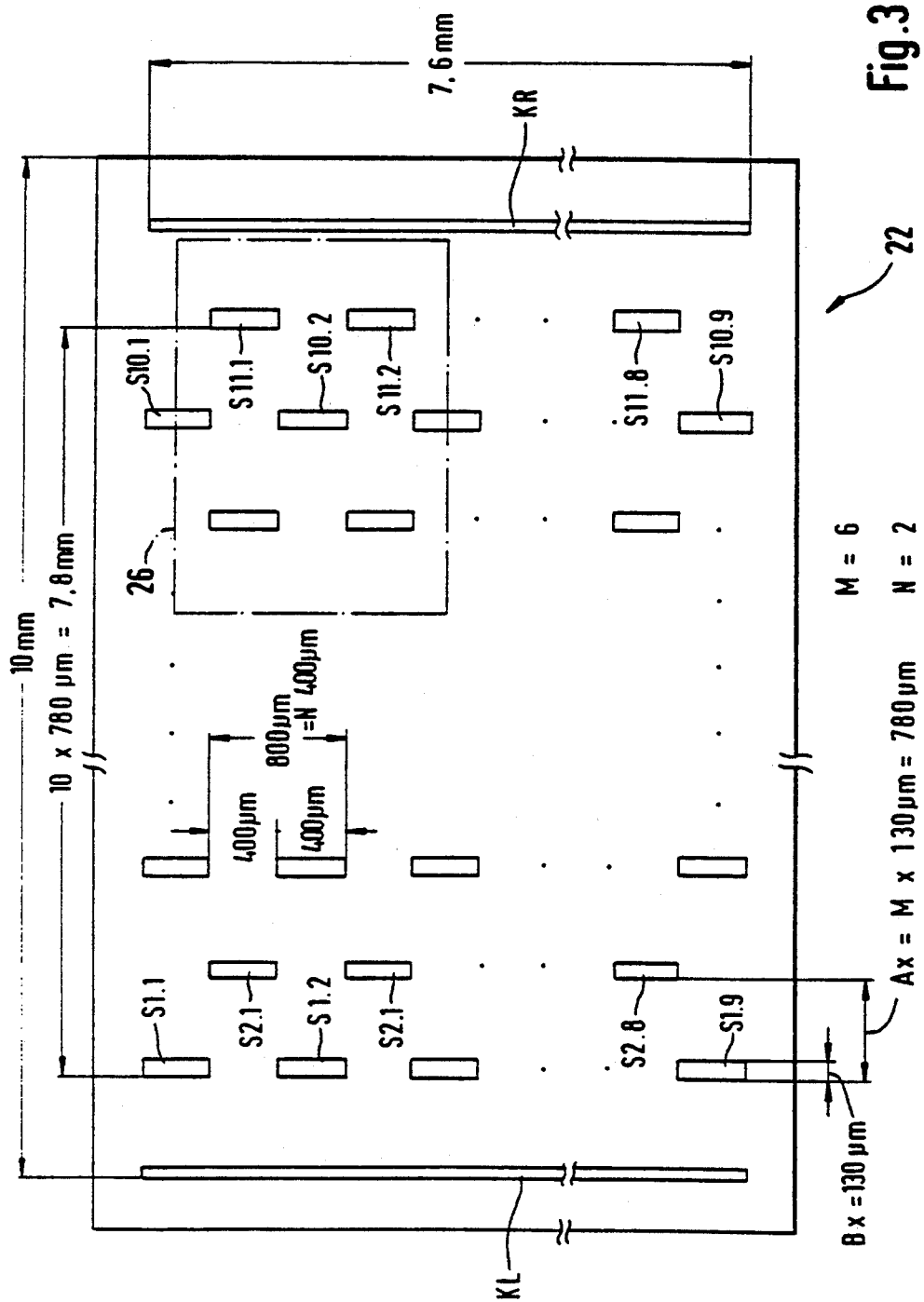

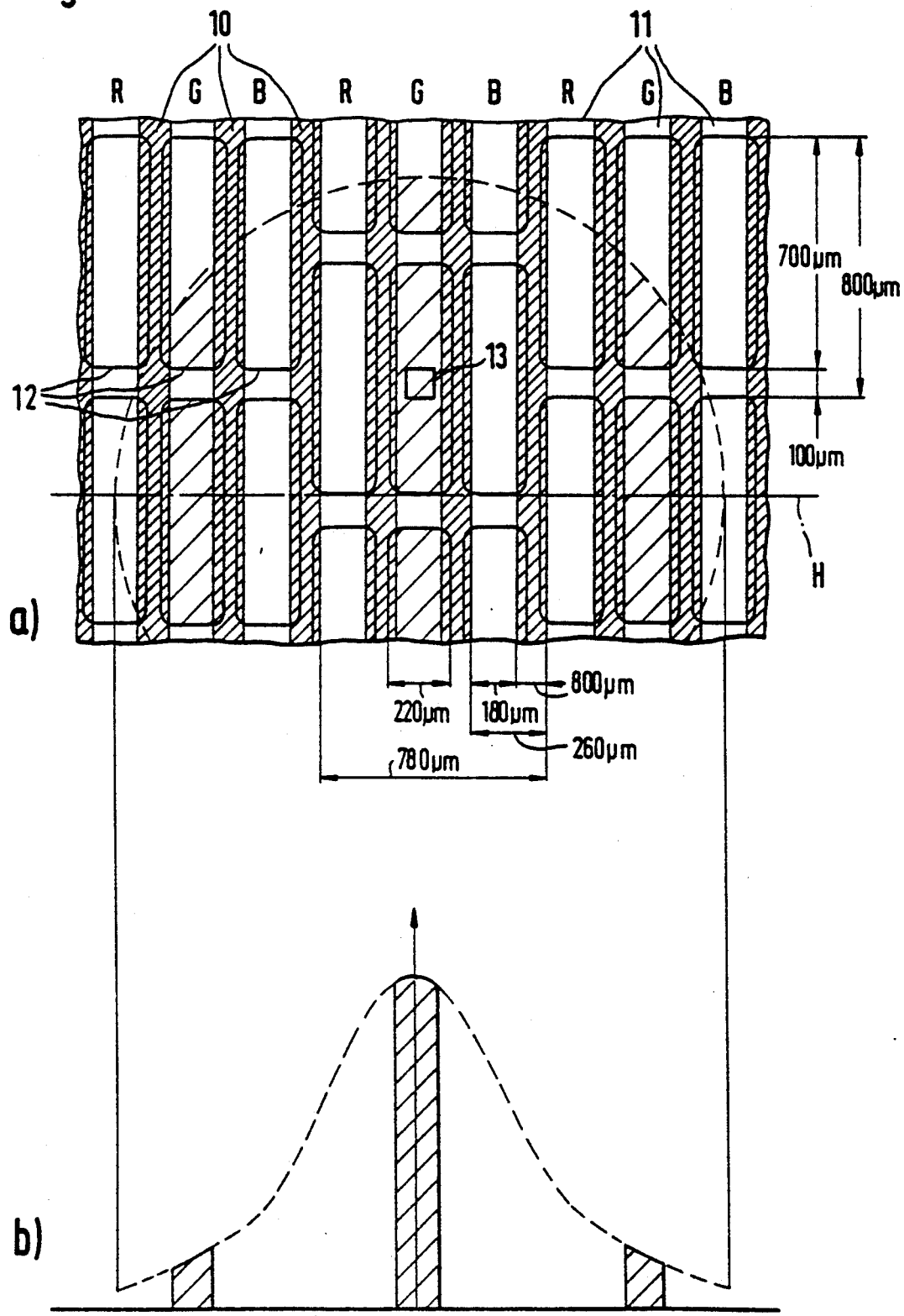

DEVICE AND PROCESS FOR MEASURING AN ELECTRON DENSITY DISTRIBUTION IN A CATHODE RAY TUBE WITH AN IMAGE CONVERTER CAMERA AND A SEQUENCE CONTROLLER

TECHNICAL FIELD

The following concerns a process and a device for measuring the density distribution of an electron beam in a color picture tube.

BACKGROUND OF THE INVENTION

Terms that are used below in the presentations of the prior art and of the invention are explained first with reference to FIGS. 5a and b. FIG. 5a schematically depicts a partial plan view of the luminous screen of a color picture tube, while FIG. 5b illustrates the density distribution of an electron beam.

The luminous screen according to FIG. 5a has matrix stripes 10 and phosphor stripes 11 for three different colors, indicated by R for red, G for green, and B for blue. Associated with each color is an electron beam that is scanned in the x and y directions over the luminous screen. Electrons then penetrate, in the form of a spot 12, through a shadow mask (not depicted) and strike the luminous screen. In the example according to FIG. 5a, each spot has a height of 700 μm and a width of 220 μm. The vertical spacing between the beginnings of adjacent spots is 800 μm, while the horizontal spacing is 260 μm. However, the spots do not produce a luminous effect over their entire area, but only in that region in which a spot strikes a phosphor stripe. It should be mentioned that the aforesaid dimensions apply essentially to the center of the color picture tube. Towards the edge in the horizontal direction, the widths of the phosphor stripes get larger and the spot widths smaller. In the vertical direction, the spot widths decrease toward the edge.

While a luminous region, as just defined, is that area of the luminous screen in which an individual electron spot produces a luminous effect, a luminous segment is a portion of a luminous region that is perceptible through the hole 13 of a mask. The term "luminous domains" is used as a general term. Luminous domains can be any luminous areas, for example only portions of a segment, or a plurality of luminous segments or regions domains can be any luminous areas, for example only portions of a segment, or a plurality of luminous segments or regions together.

Drawn in FIG. 5a as a dashed segment of a circle is a line that is designed to illustrate the boundary of a stationary electron beam. This boundary is drawn at 5% of the maximum brightness of the beam. The brightness distribution is depicted in FIG. 5b. It corresponds essentially to the electron density distribution; the latter can therefore be determined by measuring the brightness distribution produced by the electron beam on the luminescent screen.

If no shadow mask were present, if the screen were homogeneously coated with phosphor, and if the electron beam were well formed, a circular electron spot would strike the luminescent screen and generate on it a circular luminous spot whose periphery would coincide with the dashed line 14 of FIG. 5a. However, only a few regions of this hypothetical luminous spot actually luminesce; these are indicated in FIG. 5a by cross-hatching in the phosphor stripes G. It should be mentioned at this point that when a color picture tube is operated with a single electron beam, not all the spots 12 according to FIG. 5a are perceptible, but only those that belong to the electron beam that was just emitted, for example the one that is designed to excite luminescence in the green-emitting phosphor stripes Only those regions of these phosphor stripes that lie within the circle with the periphery 14 will in turn luminesce. In what follows, when an electron spot is discussed, it is to be understood as the electron spot that would be generated by a single electron beam if the shadow mask were absent A "luminous spot" is understood to mean the area that such a hypothetical electron spot would generate if the luminescent screen were homogeneously coated with phosphor.

In a known process for measuring electron density distribution, viewed over the cross section of an electron beam in a color picture tube, a luminous spot is observed through the mask hole 13 of FIG. 5a with a light-sensitive diode which, in some circumstances with an additional optical system, acts as a camera. The mask shields the diode from all light except that which penetrates through the mask hole 13. The electron beam is then aligned so that its center coincides with the mask hole 13 (beginning at the position in FIG. 5a, it would therefore need to be displaced slightly upward) Then the electron beam is moved horizontally and vertically under the mask hole. This produces a profile of brightness over time, as drawn in FIG. 5b as a local profile for brightness along the horizontal center line H (FIG. 5a). The brightness distribution along the vertical center line looks the same when the electron beam is circularly symmetrical.

The known process therefore possesses the following steps:
displace the electron beam;
record the images of luminous spot domains that are perceptible, as the electron beam is displaced, due to the effect of a masking means; and
analyze the recorded images to obtain a result concerning the luminance distribution produced by the electron beam, which is essentially identical to the electron density distribution.

The known device possesses the following features
a masking means;
a camera (19) to record the images of luminous spot domains that are perceptible due to the action of the masking means;
a driving arrangement (18) to drive a deflection arrangement (17) on the color picture tube in such a way that the electron beam is displaced with respect to the camera; and
an analysis arrangement (20) to analyze the images recorded by the camera, in order to obtain a result concerning the luminance distribution produced by the electron beam, which is essentially identical to the electron density distribution.

With this process and the associated device, the mask must be aligned with the center of a phosphor stripe, and the electron beam must be moved in the x and y directions behind the mask hole so that its center coincides in each case with the center of the mask hole. These laborious alignment procedures must be repeated for each of three electron beams at different screen locations in order to examine the beam shape for an entire screen.

As is evident from the above, the problem that existed was to indicate a process and a device of the aforesaid type that requires no alignment effort.

SUMMARY OF THE INVENTION

The device according to the invention possesses the device features listed above, and is characterized in that the camera is an image converter camera (19) and a sequence controller (21) is present, which is designed so that to generate a simulated masking means,
it drives the driving arrangement (18) to deflect the electron beam in such a way that luminous spots are generated in the entire field of view of the image converter; and
it drives the analysis arrangement (20) so that the latter selects for later use those image converter regions that lie within those image converter regions in which the luminous spots are imaged, with the selected image converter regions acting as simulated masking slots of a simulated masking means, through which the luminous spot segments are perceptible; and to define the electron density distribution,
it drives the driving arrangement (18) so that the latter displaces the electron beam in steps, with a step size such that each luminous spot segment perceptible before the displacement step is just no longer perceptible after the displacement step, with driving occurring for a number of steps, at least in the horizontal direction, such that all luminous spot domains are perceptible exactly once;
it drives the image converter camera (19) so that the latter, before the first displacement step and after each further displacement step, records images of the luminous spot segments perceptible in each case; and
it drives the analysis arrangement (20) so that the latter stores all the images, and assembles them into an overall image for the luminance distribution generated by the electron beam.

The process according to the invention possesses the process steps of the known process listed above, and is characterized in that to record the images, an image converter camera is used;
to generate a simulated masking means, luminous spots are generated in the entire field of view of the image converter, and the image converter regions selected for later use are those that lie within those image converter regions in which the luminous spots are imaged, with these selected image converter regions acting as simulated masking slots of a simulated masking means through which the luminous spot segments are perceptible; and
to define the electron density distribution,
the electron beam is displaced in steps, with a step size such that each luminous spot segment perceptible before the displacement step is just no longer perceptible after the displacement step, with driving occurring for a number of steps, at least in the horizontal direction, such that all luminous spot domains are perceptible exactly once;
the image converter camera is driven so that before the first displacement step and after each further displacement step, it records images of the luminous spot segments perceptible in each case; and all the images are stored and assembled into an overall image for the luminance distribution.

With the device and the process according to the invention, no alignment whatsoever is required, since firstly the masking means is simulated by the fact that only certain regions of the image converter are permitted for image analysis, and secondly it is not true, as in the prior art, that two sections of the brightness distribution are recorded, and must be hit as exactly as possible, since instead the luminance distribution for the entire (hypothetical) luminous spot is recorded. Any desired sections can then easily be applied, by electronic means, in the overall image recorded in this fashion.

The device and the process according to the invention work in such a way that by stepwise displacement of the electron beam, all of the luminous spot domains are recorded. Displacement is produced by changing the deflection current. To displace the electron beam in each case so that each phosphor segment considered always directly adjoins adjacent segments previously considered, the correlation between deflection current and displacement step size must be known as accurately as possible. For coarse measurements, this correlation can be applied and stored for each specific tube type and for each different screen location. It is more precise, however, to perform a real-time calibration for each screen location. For this purpose, the simulated masking means is varied so that it has at least one pair of simulated calibration slots parallel to one another, which are spaced apart from one another by a predefined distance in the direction perpendicular to the long axis of the slot In a first calibration step, the electron beam is then set to a predefined position, and the deflection current required to do so is measured. The predefined position is, for example, the position at which maximum brightness is measured behind the left simulated calibration slot. In a second calibration step, the electron beam is set to a second predefined position, and once again the deflection current required to do so is measured. This second position is, for example the position in which maximum brightness is measured behind the right simulated calibration slot. The ratio (difference between measured deflection currents)/(distance between simulated calibration slots) is determined and used as the sensitivity for step size adjustment. The required deflection current can be precisely calculated from this sensitivity and from the required displacement travel.

It is especially advantageous to use a simulated masking means with a larger number of simulated measurement slots, with the arrangement of the simulated measurement slots corresponding to the arrangement of the mask slots, and with the distance between adjacent simulated measurement slots in the x and y directions corresponding in each case to an integral multiple of the mask slot width and height, respectively. Specifically, in this case the electron beam needs to be displaced less often for all its domains to be recorded, than if only one image at a time were recorded through a single simulated measurement slot after each displacement step.

To achieve high measurement accuracy, it is advantageous to use a CCD image converter.

BRIEF DESCRIPTION OF THE DRAWINGS

FIG. 3 is an enlarged plan view of a mask arrangement whose effect is simulated by a masking means;

FIGS. 5a, 5b are a partial plan view of a luminous screen, and depiction of the electron density of an electron beam in the horizontal direction, to explain various terms.

BEST MODE FOR CARRYING OUT THE INVENTION

Figure 1:
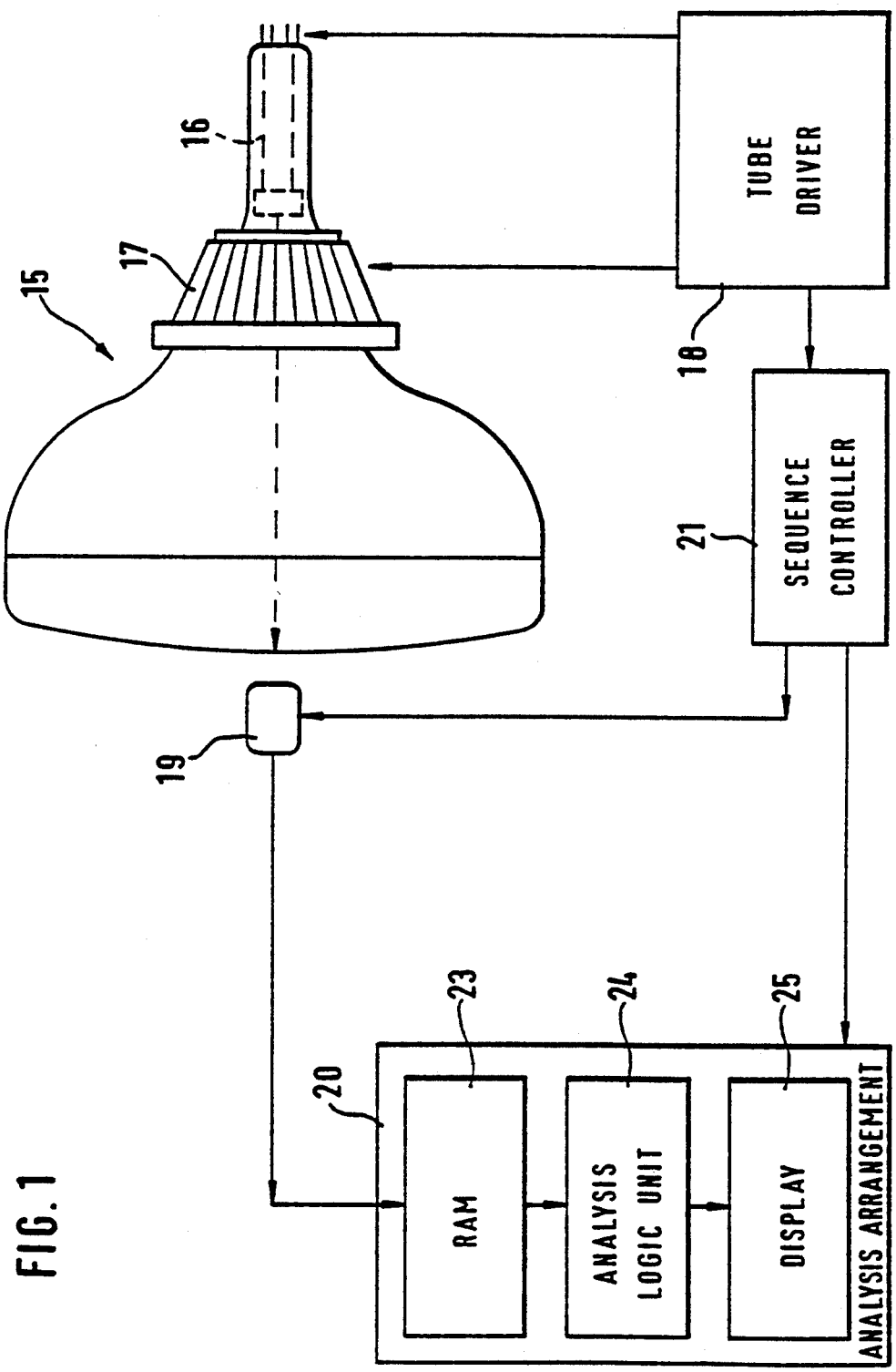
FIG. 1 is a functional block diagram to explain a process and a device for measuring the electron density distribution of an electron beam in a color picture tube.

The device according to FIG. 1 for measuring the electron density distribution of an electron beam operates on a color picture tube with an electron beam generator 16 and a deflection arrangement 17. The measurement device has a tube driver 18 to drive the electron beam generator 16 and the deflection arrangement 17, a CCD image converter camera 19, and an analysis arrangement 20. The temporal sequence in which the tube driver 18, the CCD image converter camera 19, and the analysis arrangement 20 function is controlled by means of a sequence controller 21. The analysis arrangement 20 has a RAM 23, an analysis logic unit 24, and a display 25.

Figure 2:
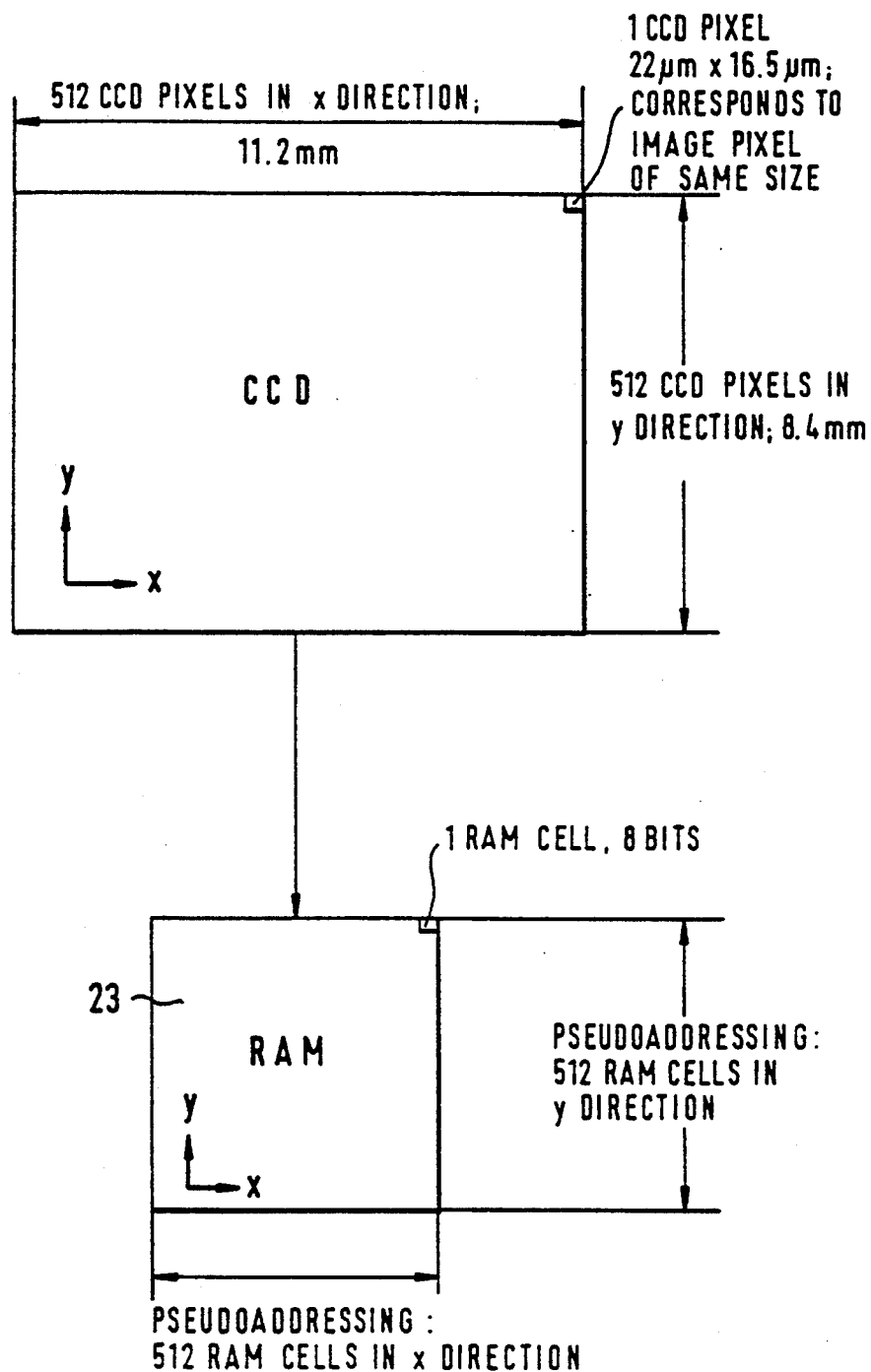
FIG. 2 is a block circuit diagram to explain the correlation between pixels of a CCD image converter and memory cells of a RAM.

The image converter camera has a CCD, as depicted in FIG. 2. It has 512 pixels in both the x and y directions. Each pixel is 22 $\mu$m wide and 16.5 $\mu$m high, and therefore has an image ratio of 4:3. The edge lengths of the CCD are 11.2 and 8.4 mm. Each CCD pixel stores one charge quantity, which depends on the amount of light striking the pixel.

The charges from the CCD pixels are read into the RAM 23 by means of the sequence controller 21. This RAM has $2^{18}$ cells of 8 bits each (256 kilobytes). For better comprehension, FIG. 2 assumes a pseudoaddressing of 512 RAM cells in each of the x and y directions, corresponding to the number and arrangement of the CCD pixels This depiction makes it immediately evident that information corresponding to the image recorded by the CCD can be stored in the RAM.

Only certain regions in the RAM are released for image analysis, so that the image usable in it corresponds to one that would be visible through a masking arrangement. The RAM thus simulates a masking means. This simulated masking means is depicted in FIG. 3 as the masking arrangement 22. It has two simulated calibration slots KL and KR, and a plurality of simulated measurement slots Sa.b (a=1, 2, ..., 11; b=1, 2, ..., 9 for odd a, but 1, 2, ..., 8 for even a). Each of the two simulated calibration slots KL and KR extends in the y direction with a length of 7.6 mm and a width of 50 $\mu$m. The spacing in the x direction is 10 mm. Each of the simulated measurement slots Sa.b has a horizontal width Bx of 130 $\mu$m and a vertical width By of 400 $\mu$m. The pattern spacing Ax in the x direction is 6×130=780 $\mu$m, while the pattern spacing Ay in the y direction is 2×400=800 $\mu$m.

In FIG. 3, a portion of the masking arrangement 22 is surrounded by a dot-dash line. The dimensions of this portion of the simulated masking means essentially correspond to those of the screen portion of FIG. 5a.

The simulated masking means is aligned relative to the phosphor stripes so that the vertical center lines coincide with the vertical center lines of those phosphor stripes on which regions are luminescing. This is done very simply by first operating the tube so that all the luminous spots in the field of view of the image converter that belong to the electron beam being investigated are luminescing. The image of this region is recorded. The corresponding regions in RAM are then determined, and within these regions those that will be used for subsequent image analysis are defined. These are the simulated measurement slots. They are placed so that edge effects perceptible in the luminous spots have as little impact as possible on the later measurement.

Figure 4A:
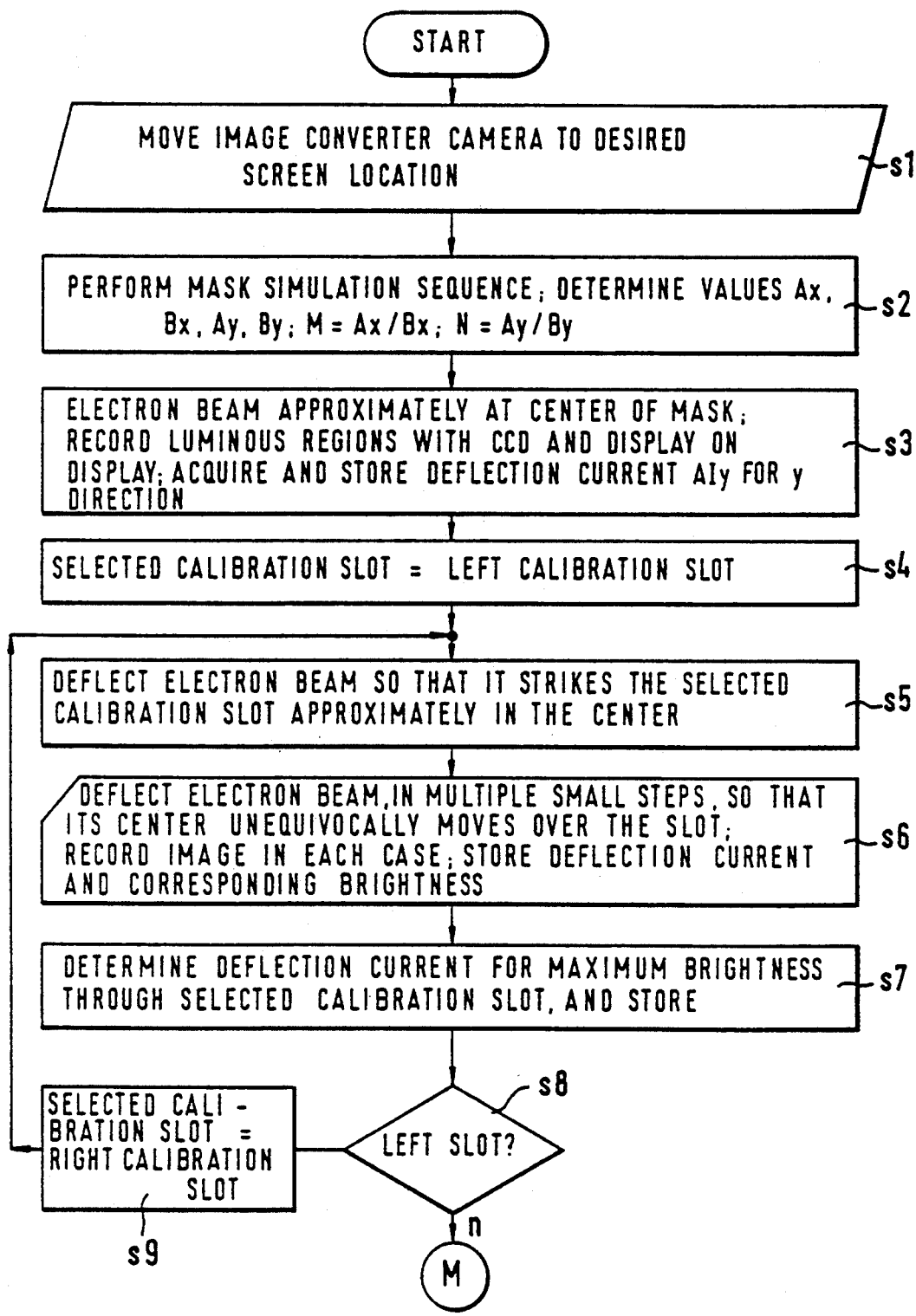
FIGS. 4a, 4b are a flow diagram explaining an exemplary embodiment of a process for measuring the electron density distribution of an electron beam.
Figure 4B:
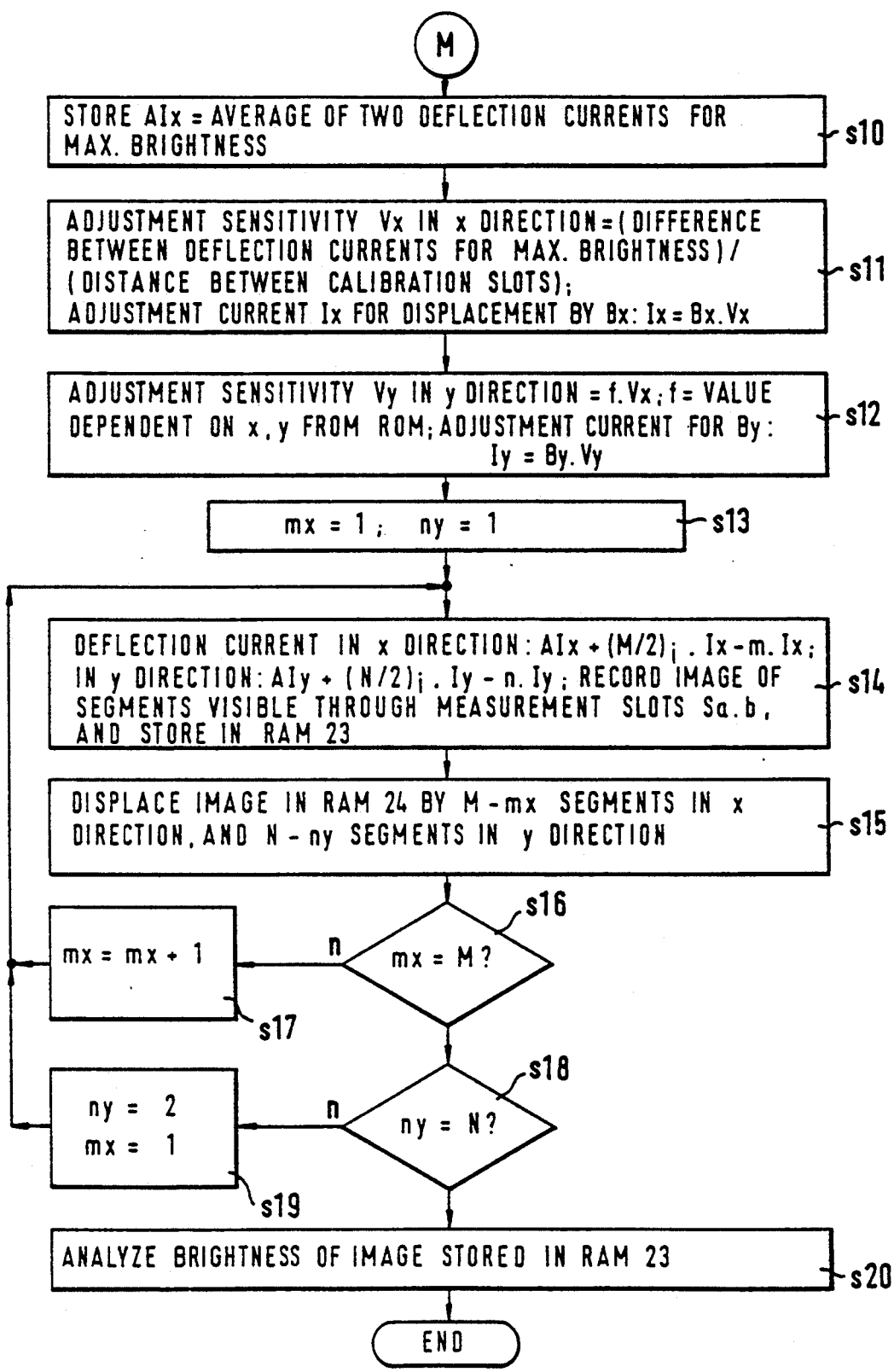

With reference to FIG. 4, an exemplary embodiment of a process that can be implemented by the device according to FIG. 1, and is based on the dimensions indicated in FIGS. 2 and 3, will now be explained.

First (step s1), the user places the camera 19 at a selected screen location He then initiates the mask simulation sequence described in the paragraph before last (step s2). The data Bx, Ax, By, and Ay are then defined. These data are used to determine two whole numbers M and N, which indicate how often a simulated measurement slot fits, in the x and/or y directions, into the domain up to the adjacent simulated measurement slots These two whole numbers are stored in a RAM included in the analysis logic unit 24.

Then (step s3) the electron beam is moved to approximately the center of the image converter. The illuminated domains generated by the electron beam are continuously recorded by the image converter camera 19, and after intermediate storage in the RAM 23 and analysis in the analysis logic unit 24, are displayed on the display 25. The user can thus center the electron beam fairly precisely by observing the display 25. As soon as this has been done, the deflection current Aly last applied for the adjustment in the y direction is acquired and stored. The aforesaid RAM in the analysis logic unit 24 is used for this purpose.

There then follow steps s4 to s9 for a calibration procedure. First the left simulated calibration slot KL is selected (step s4) as the selected calibration slot. Then the electron beam is deflected so that it strikes the selected calibration slot approximately in the center (step s5). Then the electron beam is deflected, in a plurality of small steps, so that its center unequivocally moves over the selected calibration slot. An image is recorded after each step, and this image is analyzed to determine the brightness of the light passing through the simulated calibration slot. The brightness and associated deflection current for each step are stored (step s6). Once these adjustment steps have been completed, the deflection current for maximum brightness through the selected calibration slot is determined, and this value is stored (step s7). If it is found in a subsequent step s8 that the selected calibration slot is the left simulated calibration slot, in a following step s9 the right simulated calibration slot KR is selected as the calibration slot, and steps s5 to s7 are repeated accordingly. When step s8 is once again reached, this time it is found that the selected calibration slot is not the left simulated calibration slot, and the rest of the process sequence therefore follows.

In the following steps s10 to s12, various values are calculated from the measurement results acquired in the calibration procedure according to steps s4 to s9.

First the average Alx of the two deflection currents for maximum brightness is determined (step s10). When this deflection current is applied, the electron beam will be located precisely halfway between the two simulated calibration slots. The adjustment sensitivity Vx in the x direction is then determined, being the ratio (difference between deflection currents for maximum brightness in each case)/(distance between the simulated calibration slots) This yields the adjustment current Ix which displaces the electron beam by the distance Bx, namely Ix=Bx×Vx (step s11). A corresponding value is needed for the y direction. A calibration procedure corresponding to the one for the x direction could be performed for this purpose, but in practice this is generally not necessary, since the ratio between the deflection currents for the x and the y direction, which each cause a predefined identical displacement, is known for each screen location with considerably greater relative accuracy than the current needed, for example, to reach a certain x location in the x direction. The adjustment values for the y direction are therefore determined not by calibration, but by determining the adjustment sensitivity Vy in the y direction, namely Vy=f×Vx, where f is a predetermined factor The adjustment current Iy to displace the electron beam by a distance By is Iy=-By×Vy (step s12).

Once all the variables for correct adjustment of the electron beam have been determined, steps s13 to s19 are performed. The purpose of these steps is to record a hypothetical luminous spot that would be generated if no shadow mask were present and if the luminous screen were homogeneously coated with the phosphor that the electron beams are currently striking after passing through the shadow mask.

As explained earlier with reference to FIG. 2, the electron beam must be displaced five times horizontally over a width Bx, and once vertically over a width By, in order for all the luminous spot domains to be visible once through the simulated measurement slots A total of six images for the x direction, in both a first and a second vertical position, are required. Two counting parameters, mx and ny, are used for the images In step 13, both parameters are set to a value of "1". Then the electron beam is displaced in steps that are located approximately symmetrically with respect to its center position. For this purpose, a current AIx+(M/2)$_i$×I$_x$-−m×I$_x$ is applied in each case for the x direction, and a deflection current AIy+(N/2)$_i$×I$_y$−n×I$_y$ for the y direction. The subscript i in this case indicates that the integral portion of the fraction is meant. As soon as these currents have been applied to the electron beam, the image of the segments perceptible through the simulated measurement slots is recorded and stored in the RAM 23 (step s14).

Since all the images are recorded through the same simulated measurement slots and therefore are recorded by the same CCD pixels for each step, but since the images concern segments of the electron spot that are adjacent to one another, one must ensure that these individual images are in fact located next to one another and not on top of one another. This is done in step s15 by displacing the image in the RAM by M−mx regions in the x direction, and N−ny regions in the y direction. Once this has been done, a determination is made in step s16 as to whether the images for all segments in the x direction have already been recorded. If this is not the case, the value mx is increased by "1" in a step s17, and steps s14 to s16 are repeated. If it is found in step s16 that all the necessary images in the x direction have been made, a check is made in step s18 as to whether all images have been completed for the y direction. Since this is not yet the case, in a step s19 the value of the counting parameter ny is set to "2", while mx is again assigned a value of "1", so that the loop of steps s14 to s17 is executed again, until all six images in the x direction have been prepared for the second y position as well. When these six images have been prepared, step s18 has again been reached; here it is found that all the y positions have also been processed. All that now remains is to analyze the brightness of the image stored in RAM (step s20). This can be done, for example, along the horizontal and vertical center axes of the recorded image, which yields the same measurement result as with conventional processes. The process and the device according to the invention are based, like the prior art, on the assumption that the electron density distribution is identical to the brightness distribution.

The process ends after the step s20 just explained It can be performed again at the same screen location, in the manner described above, for the electron beams for the other two colors, with no need for prior mechanical alignment. All that is needed to measure the two remaining electron beams is to perform steps s13 to s20 of the sequence in FIG. 4, since the values determined in steps s1 to s12 are essentially identical for all electron beams at a predefined screen location.

With regard to the x direction, five images in the x direction for each y position would be sufficient given the geometry of FIG. 5, which would assume the use of simulated measurement slots with a width of 156 μm rather than 130 μm. However, this would then not rule out the possibility that edge effects of the mask slots would be noticeable.

It should be mentioned that the sequence described above of displacements in two y positions is not actually necessary with continuous phosphor stripes as depicted in FIG. 5 a). This is easily understood by considering the simulated masking arrangement of FIG. 3: displacement in steps of the aforesaid step size, over a total distance of 2×Ax, makes all the surface domains located behind the mask visible once—with the exception of domains in the edge regions. It is therefore advantageous to perform only x displacements, and not y displacements. The sequence described with reference to the flow diagrams is necessary, however, when measuring a luminous spot in a tube that has phosphor dots rather than stripes.

In principle, it is sufficient to work with a single simulated measurement slot; this is recommended, however, only when the electron beams have a very small diameter. Only in this latter case is it possible to perform only a few displacements despite the presence of only one simulated measurement slot. Each displacement, with the associated image recording, takes about 30 msec. The calculations to analyze the complete recorded image take about 1 second. If a large electron spot is imaged using, for example, 40 simulated measurement slots with a total of 12 images, the entire measurement subsequent to calibration takes only about 2 seconds However, if approximately 40 times as many images had to be recorded because only a single simulated measurement slot was being used, measurement time would increase to about 30 seconds.

It should be mentioned that an auxiliary deflection arrangement, rather than the deflection arrangement that is present in any case, can be used to displace the electron beam for the individual measurements.

In accordance with the description above, the electron beam is displaced by only a small amount during the measurement procedure. This approach is only possible, however, if the electron density distribution of very weak electron beams is being measured. In the case of an electron beam with a beam current of 3 mA, it would be pulsed during the measurement sequence at 50 Hz for 20 μsec each time, i.e. at a pulse duty ratio of 1:1000.

We claim:

1. A device for measuring an electron density distribution, viewed over a cross section of an electron beam, with which the electron beam would strike a luminous screen of a color picture tube and generate a luminous spot if no shadow mask were present and if the luminous screen were homogeneously coated with phosphor, with only certain regions of the luminous screen being excited to luminesce by the electron beam in the color picture tube, comprising:

a masking means;

an image converter camera (19) to record images of luminous spot domains that are perceptible due to the action of the masking means on the luminous screen;

a driving arrangement (18) to drive a deflection arrangement (17) on the color picture tube in such a way that the electron beam is displaced with respect to the camera (19); and an analysis arrangement (20) to analyze the images recorded by the camera (19), in order to obtain a result concerning a luminance distribution produced by the electron beam, which is essentially identical to the electron density distribution;

a sequence controller (21)

for generating a simulated masking means by, driving the driving arrangement (18) to deflect the electron beam so that luminous spots are generated in the entire field of view of the image converter camera (19); and driving the analysis arrangement (20) to select for later use selected image converter regions that lie within image converter regions in which the luminous spots are imaged, the selected image converter regions acting as simulated masking slots of a simulated masking means, through which luminous spot segments are perceptible; and defining the electron density distribution by, driving the driving arrangement (18) to displace the electron beam in steps, with a step size such that each luminous spot segment which is perceptible before each displacement step is substantially no longer perceptible after the displacement step, with the driving occurring for a number of steps, at least in the horizontal direction, such that all luminous spot domains are perceptible exactly once;

driving the image converter camera (19) to record before a first displacement step and after each further displacement step, images of each perceptible luminous spot segments; and driving the analysis arrangement (20) to store all the images, and to assemble them into an overall image for the luminance distribution generated by the electron beam.

2. A device according to claim 1, characterized in that the simulated masking means (22) has at least one pair of simulated calibration slots (KL, KR) parallel to one another, which are spaced apart from one another by a predefined distance in the direction perpendicular to the long axis of the said simulated calibration slots.

3. A process for measuring an electron density distribution, viewed over a cross section of an electron beam, with which the electron beam would strike a luminous screen of a color picture tube and generate a luminous spot if no shadow mask were present and if the screen were homogeneously coated with phosphor, with only certain regions of the luminous screen being excited to luminesce by the electron beam in the color picture tube, comprising the following steps:

displacing the electron beam;

recording with an image converter camera the images of luminous spot domains that are perceptible, as the electron beam is displaced, due to the effect of a masking means; and analyzing the recorded images to obtain a result concerning a luminance distribution produced by the electron beam, which is essentially identical to the electron density distribution;

providing a simulated masking means by generating luminous spots in the entire field of view of the image converter, and selecting image converter regions for later use as those that lies within those image converter regions in which the luminous spots are imaged, with these selected image converter regions acting as simulated masking slots of a simulated masking means through which the luminous spot segments are perceptible; and defining the electron density distribution, by displacing the electron beam in steps, with a step size such that each luminous spot segment perceptible before each displacement step is substantially no longer perceptible after the displacement step, with driving occurring for a number of steps, at least in the horizontal direction, such that all luminous spots domains are perceptible exactly once;

driving the image converter camera so that before the first displacement step and after each further displacement step, the image converter camera records images of each perceptible luminous spot segments perceptible; and storing and assembling all the images into an overall image for the luminance distribution.

4. A process according to claim 3, characterized in that in a first calibration step, the electron beam is set to a predefined position, and a deflection current required to do so is measured;

in a second calibration step, the electron beam is set to a second predefined position, and a deflection current required to do so is measured; and the sensitivity used to set the step size for the displacement steps is a ratio (difference between measured deflection currents)/(distance between simulated calibration slots).

* * * * *